UNITED STATES PATENT OFFICE.

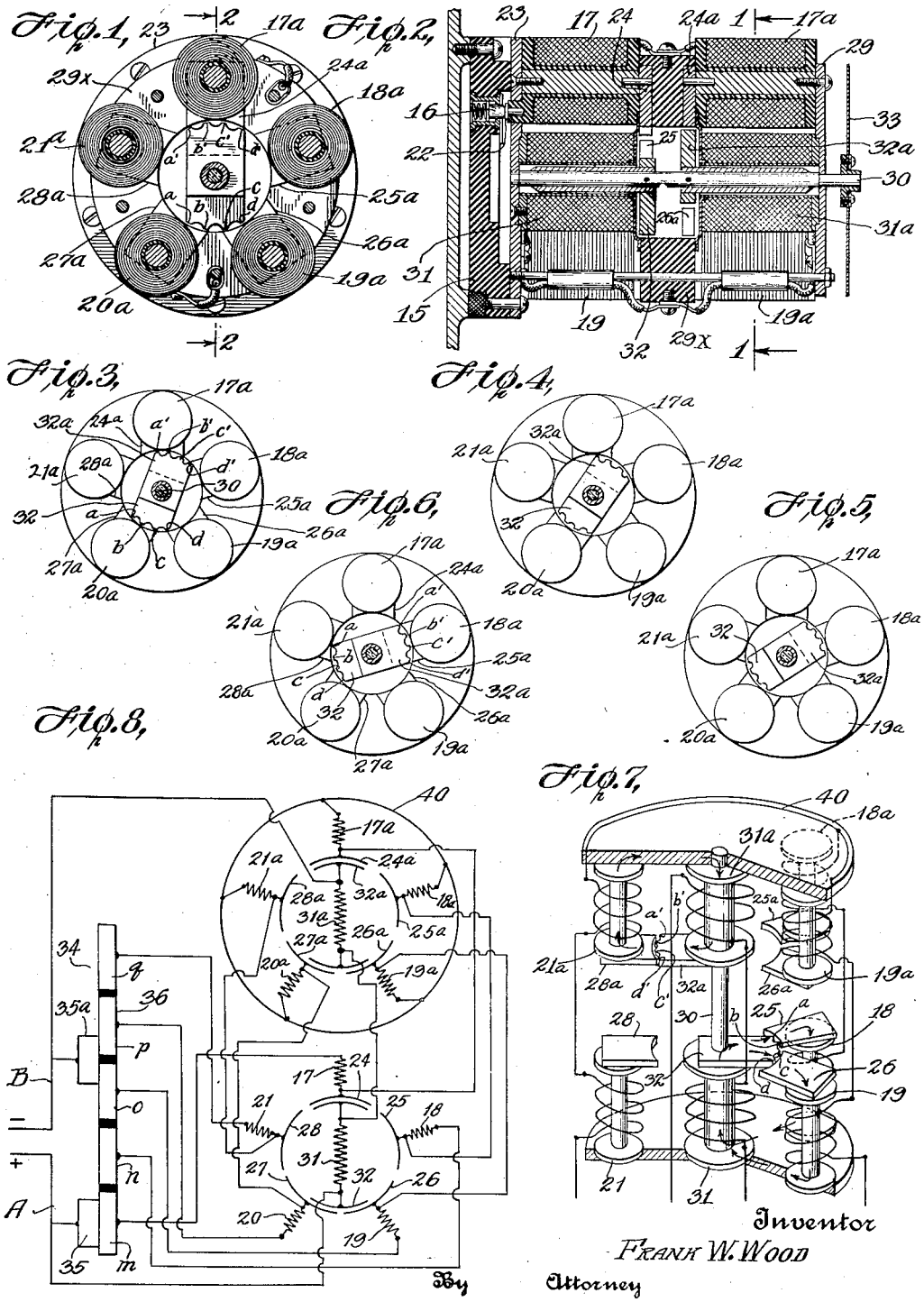

FRANK W. WOOD, OF NEW YORK, N. Y., ASSIGNOR TO CHARLES CORY & SON, INCORPORATED, OF NEW YORK, N. Y., A CORPORATION OF NEW YORK.

ART OF PRODUCING STEP-BY-STEP MOVEMENTS.

1,408,555.   Specification of Letters Patent.   Patented Mar. 7, 1922.

Application filed November 13, 1918. Serial No. 262,313.

*To all whom it may concern:*

Be it known that I, FRANK W. WOOD, a citizen of the United States, residing at New York, in the county of New York and State of New York, have invented new and useful Improvements in the Art of Producing Step-by-Step Movements, of which the following is a specification.

This invention relates to improvements in the art of producing step-by-step movements to a rotatable element, pertaining more particularly to that type of such inventions wherein the element movements are provided by the resultant action of a plurality of magnetic circuits.

For the purpose of explaining the present invention, I have shown it as employed in connection with a motor for electric telegraphs or signals, but it will be understood that the invention is not limited to such particular use, being adapted for service in other connections where it is desired to provide a step-by-step operation through a comparatively large number of positions by the use of a minimum of field magnets and at the same time provide for accurate positioning of the rotating element in either of the steps or positions.

In apparatus designed for signalling purposes, as for instance ships' telegraphs, it has been the practice to locate a dial or pointer on the shaft or other part of a rotating element, the step-by-step movements of the latter being arranged to shift the position of the indicator in such manner as to deliver the predetermined signal. A common form of such apparatus is designed to locate the indicator in either one of ten positions through the action of groups of magnets arranged in parallel to co-operate with two polarized elements carried by the rotating element, the grouping being changed to provide the element movements. One form of such apparatus—shown, for instance, in the prior patent granted to me June 23, 1914, No. 1,100,860—employs five sets or pairs of field magnets, the pairs being axially alined and connected in series with each magnet having a pole piece adapted to co-operate with a polarized element; by means of a suitable circuit make and break device for the circuits of the field magnets various groups of the field magnet circuits can be completed, thus energizing the pole pieces of predetermined field magnets to provide that co-operation with the polarized element necessary to produce the step-by-step operation.

The present invention is designed to increase the total number of step positions in which it is possible to accurately position the rotating element without the necessity of increasing correspondingly the number of field magnets or polarized elements, this result being obtained by changing the general character of the groupings of the magnet circuits, and by providing a change in the polar configuration of the polarized elements, it being understood of course that the circuit make and break device will be changed to meet the changed conditions. For instance, instead of obtaining only the ten position operation by the use of the five sets or pairs of magnets disclosed in the patent referred to, the number of such positions can be increased to twenty, doubling the number heretofore obtained, the movements of the rotating element to each position being with certainty and providing an accurate location of the element in such position. Obviously, the principles of the invention may be applied to structures employing a greater or less number of such sets or pairs of magnets; for instance, motors having three, nine or fifteen of such sets or pairs may be operated in accordance with these general principles, these simply being examples of the possibilities of application, the present disclosure being of the five-set form.

The principal characteristic of the present invention is that of forming the polar end of each polarized element with a plurality of salient poles, each element having more than two of such poles equally spaced—the particular form shown herein utilizing four salient poles since the particular embodiment is designed to double the number of step positions heretofore obtained. Another characteristic is that of producing the step-by-step movements through varying the number of active magnetic circuits, a minimum number being employed in advancing an element to and maintaining it in one of the step positions, the succeeding advance being provided by establishing an additional magnetic circuit effective on the polarized structure, this additional circuit being maintained in addition to those previously established in maintaining the rotating element in its advance position; the succeeding advance movement of the rotating element is produced by rendering one of the first-established circuits inactive, thus again reducing the number of active magnetic circuits to the former minimum number, the structural difference being, however, that during the advance of the two steps one field was thereby rendered inactive and another added to take its place. By the combined action of these characteristics, the number of steps possible in a complete revolution of the rotating element is not only doubled but each step is provided positively and with accuracy, the definite polar area of the salient pole formation producing the effect of a magnetic lock which ensures that the movements will be of definite length and free from the over-running or under-running or other oscillatory effects.

To these and other ends, therefore, the nature of which will be readily understood as the invention is hereinafter disclosed, said invention consists in the methods and apparatus for exemplifying the same hereinafter more fully disclosed, illustrated in the accompanying drawings, and more particularly pointed out in the appended claims.

In the accompanying drawings, in which similar reference characters indicate similar parts in each of the views,—

Figure 1 is a sectional view of a structure adapted to illustrate the principles of the invention, the section being taken on line 1—1 of Fig. 2.

Fig. 2 is a sectional view of the same taken on line 2—2 of Fig. 1.

Figs. 3 to 6 are diagrammatic views respectively showing parts of Fig. 1 in succeeding step positions of the rotating element.

Fig. 7 is a diagrammatic view illustrating magnetic circuits.

Fig. 8 is a wiring diagram for the form of apparatus shown in Fig. 2.

While the structure of Figs. 1 and 2 is of one specific embodiment only of apparatus employed by me in carrying out the principles of the invention, it will be understood that this structure is illustrative only both as to structure and number of field magnets employed, the invention not being limited in these respects. For explanatory purposes a brief description of the specific form is given.

15 indicates an insulating base on which the structure is mounted, this base carrying suitable contacts 16, corresponding in number and properly arranged to provide electrical connection with the several field magnets indicated respectively at 17, 18, 19, 20 and 21. In the embodiment shown, the magnet structure is designed to be removable bodily from the base and hence the particular form of connection between a magnet and its contact 16 is automatically engageable, this being provided by contact 22 for each magnet, contacts 16 and 22 having contact engagement when the parts are assembled.

These magnets are mounted on and insulated from a plate 23, this plate carrying the several magnet cores to the other ends of which are secured the pole pieces 24, 25, 26, 27 and 28 of these magnets.

$17^a$, $18^a$, $19^a$, $20^a$ and $21^a$ designate the magnets of a second group, these being axially alined with those of the first group and spaced therefrom by an insulating spacing ring $29^x$, said second group having pole pieces $24^a$, $25^a$, $26^a$, $27^a$ and $28^a$ opposite the pole pieces of the first group, a plate 29 connecting the cores of the second group at the opposite end of the magnets.

Each pair of alined magnets—for instance 17 and $17^a$—are connected in series and wound in the same direction, thus producing polarities of opposite sign in the respective pole pieces 24 and $24^a$. Each pair of field magnets is also electrically connected to one of the segments of a circuit make and break device, as shown more particularly in Fig. 8, the leads extending to the first group of magnets; and as shown in said figure the second group of magnets are individually connected to a common terminal shown diagrammatically as in the form of a ring conductor 40 to which the magnet terminals are secured.

The several pairs of field magnets are shown as arranged symmetrically about a shaft 30 in a concentric relation to such shaft with the magnet pole pieces extending in radial directions relative thereto. This provides for equal spacing of the magnets and equal distances between adjacent pole pieces.

Shaft 30 is shown as mounted in plates 23 and 29 and forms the axis of an independent pair of alined magnets 31 and $31^a$ secured respectively to said plates 23 and 29 and held against rotation. The cores of magnets 31 and $31^a$ are secured to the shaft and are rotatable relative to the magnets, said cores each carrying a pole piece, these being indicated at 32 and $32^a$. Magnets 31 and $31^a$ are connected in series and wound in the same direction as in the pairs of field magnets, but have their opposite terminals directly connected to the opposite sides of the source of electrical supply, thus retaining them permanently energized, with the result that pole pieces 32 and $32^a$ each have the characteristics of a polarized element of definite sign, the two elements being of opposite sign.

The outer end of the shaft is shown as carrying an indicator 33 of suitable type, the purpose of the apparatus shown being to provide step-by-step movements to the latter.

As shown in Fig. 1, each of pole pieces 32 and 32ª have their polar faces in the form of salient poles, these being shown as four in number and indicated respectively as $a$, $b$, $c$ and $d$ for pole pieces 32, and $a'$, $b'$, $c'$ and $d'$ for pole piece 32ª. These poles are uniformly spaced and may be of equal polar area. While I have shown the number of salient poles as four in each pole piece, it will be understood that this may be varied to meet conditions of operation and service, the essential being that the number be greater than two in each of the pole pieces.

The manner of wiring the apparatus shown and described is illustrated diagrammatically in Fig. 8, 34 indicating a circuit make and break device one element of which is shown as a pair of brushes 35 and 35ª movable in unison and respectively connected to opposite sides of a source of electrical supply, the other element being shown as a member 36 carrying a plurality of segments, shown as five in number and indicated at $m$, $n$, $o$, $p$ and $q$, the number corresponding to the number of pairs of field magnets shown, these segments being insulated from each other. As will be understood the number of segments will vary as the character of the apparatus is changed, the number generally corresponding to the number of pairs of field magnets being utilized.

The segments are connected to the respective field magnets of the first group, the particular arrangement disclosed showing the following connections by suitable leads: $m$ with 17, $n$ with 18, $o$ with 19, $p$ with 20 and $q$ with 21.

Fig. 8 represents the position of the circuit make and break elements when the apparatus is in the position shown in Fig. 1. The electric circuits closed in this position are from line A to brush 35, segment $m$ magnet 17, magnet 17ª, conductor 40 and return to brush 35ª in the form of parallel circuits from conductor 40 through magnet 19ª, magnet 19 and segment $o$, and through magnet 20ª, magnet 20 and segment $p$, brush 35ª bridging segments $o$ and $p$ and being connected to line B.

As will be understood this has the effect of energizing three of the five pairs of field magnets, one magnet of each pair, however, being inactive in the production of a magnetic circuit affecting the rotating element by reason of the fact that pole pieces 32 and 32ª extend radially in opposite directions. Hence, the completion of the circuits just described serves to produce three effective magnetic circuits, one through the core of magnet 17ª, pole piece 24ª, pole piece 32ª, core of magnet 31ª to plate 29, the other two magnetic circuits being in parallel, one extending through the core of magnet 19, pole piece 26, pole piece 32, the core of magnet 31 to plate 23, the other running through the core of magnet 20 and its pole piece 27 to pole piece 32 and then as before.

Owing to the location of the several stationary pole pieces and the salient pole formation of pole pieces 32 and 32ª, it will be readily seen from Fig. 1 that all of the salient poles of pole piece 32ª will be located opposite the polar face of pole piece 24ª, while the salient poles of pole piece 32 are located opposite the polar faces of pole pieces 26 and 27, two of the salient poles being opposite pole piece 26 and two opposite piece 27. This provides a balanced relation in the fields thus produced and magnetically locks the rotating element in this position.

If, at this time, brushes 35 and 35ª be shifted so as to cause brush 35 to also contact with segment $n$—brush 35ª still bridging segments $o$ and $p$—an additional electric circuit is completed running from line A through brush 35, segment $n$ magnet 18, and magnet 18ª to ring 40 and return through either or both of the return circuits previously described to brush 35ª and line B. The completion of this additional electric circuit energizes field magnets 18 and 18ª, and since pole piece 25ª is located in proximity to pole piece 32ª, the previous balanced condition will be disturbed by the magnetic influence of pole piece 25ª, with the result that pole piece 32ª will be drawn clockwise in Fig. 1 until salient pole $d'$ is brought opposite pole piece 25ª and completes an additional magnetic circuit through the core of magnet 18ª, pole piece 25ª, pole piece 32ª (salient pole $d'$), the core of magnet 31ª and plate 29. This movement of pole piece 32ª causes a corresponding movement of both polarized elements with the result that the shifting action changes the relative arrangement of salient poles to the pole pieces, two of the field magnet pole pieces—24ª and 28—facing three salient poles, while magnet pole pieces 25ª and 27 each face one salient pole, completing four effective magnetic circuits instead of the three utilized in the previous position, an increase of one magnetic circuit to the previously established magnetic circuits. Since the polar areas of the salient poles are definite, the movement into the new position is not only positive but carries the polarized elements to this position with accuracy and without any material oscillation of the rotating element, the parts being magnetically locked in this position through the balanced relation which is thus again established. This position of the parts is shown in Fig. 3.

If brushes 35 and 35ª are again shifted in an advance direction to the succeeding position, brush 35ª will pass out of contact with segment $o$, thus breaking the electric circuit through the pair of magnets 19 and 19ª and thereby breaking the magnetic circuit which had been established through salient pole $d$, thus again disturbing the balanced condition of the polarized elements and which is immediately restored by shifting of the rotating element to the succeeding position (Fig. 4), the two electric circuits through magnets 17 and 18 having a common return through magnets 20$^a$ and 20 and thereby restoring the operating conditions of three magnetic circuits with the difference that the parallel return condition of Fig. 1 is substituted by the single return of Fig. 4, the parallel relation being transferred from the negative to the positive side of the structure. In the new position the salient poles of pole piece 32$^a$ are equally divided between pole pieces 24$^a$ and 25$^a$, while the salient poles of pole piece 32 are common to pole piece 27.

In the advance of the rotating element to the succeeding position or step (Fig. 5), the four magnetic circuit condition is again produced by rendering magnet 21$^a$ active through shifting of brushes 35 and 35$^a$ to the succeeding position, brush 35$^a$ taking its first position on segment $q$ so that it bridges segments $p$ and $q$. Establishing this additional electric circuit renders pole piece 28$^a$ active to affect the previous position of the polarized elements, the latter advancing to bring salient pole $a$ to its position relative to pole piece 28$^a$, the change leaving salient pole $a'$ active with pole piece 24, the remaining three salient poles of each polarized element being active respectively with pole pieces 25 and 27$^a$.

The succeeding position or step is produced by again reducing the number of electric circuits through shifting of brushes 35 and 35$^a$, the circuit through magnet 17 being broken, leaving the circuits of magnets 18, 20$^a$ and 21$^a$ completed, again establishing the condition of three magnetic circuits through movement of the polarized elements toward the condition of balance (Fig. 6) all of the salient poles of element 32 operating with pole piece 25, the salient poles of element 32$^a$ being equally divided between pole pieces 27$^a$ and 28$^a$.

Comparison of Figs. 1 and 6 will show that the same general electrical and magnetic conditions exist in the two positions, the difference being that the single magnetic circuit on the positive side has been changed from magnet 17 to magnet 18, and that magnet 21$^a$ has been substituted for magnet 19$^a$ on the negative side, advancing the rotating element an angular distance of 72°. In reaching this position, the rotating element has passed through three intermediate positions or steps in each of which the magnetically-locked conditions were present so that the rotating element could be positively and accurately maintained in each of such positions if desired. As will be understood, the step movements of the rotating element thus provided are each of an angular distance of 18°, and by continuing the advancing movements of brushes 35 and 35$^a$ until each has passed through all of the positions of the circuit make and break device, this general cycle of successive increase and decrease by one in the number of magnetic circuits, this cycle can be repeated until the polarized elements also have made a complete revolution, carrying the rotating element through a succession of twenty positions or steps.

From the above it will be clear that at no time is there activity concurrently of all of the pairs of field magnets, the activity being of the succession of three and four of such pairs, but in traversing the entire revolution, all of the pairs will have been active at various times. For instance, when the advancing movements of the rotating element have reached the position shown in Fig. 5 (Fig. 1 being assumed to represent the first step), each of the five pairs of magnets will have been made active. While this is a characteristic of the five or more pole structures, the three-pole structure does not have this characteristic, since in each alternate position all of the pairs will be active.

It is apparent that by suitably energizing selected magnets in the method disclosed the shaft and indicator carried thereby may be made to assume 20 different positions. In a complete cycle of operation, which includes a complete step-by-step rotation of the shaft in the manner described, it will be apparent that each pair of magnets will be active for seven successive steps, then inactive for three steps, and then again active for the succeeding seven steps, the latter period of activity affecting the opposite pole piece from the one influenced by the former period of activity, and utilizing the opposite magnet of the juxtaposed pair.

It will be noted that during the advancing movements of a polarized element in one direction, the activity of salient poles relative to a field magnet pole piece is progressively from minimum to maximum and then return to minimum, each of the poles, however, being active in each position, any change from the maximum with a pole piece placing the remaining poles in operative relation to an adjacent pole piece with which the change in number is reverse to that taking place with respect to the first pole piece.

While I have herein shown and described one way in which the principles of the present invention may be utilized, it will be readily understood that the disclosure is more or less illustrative, it being obvious that changes or modifications therein may be required or found desirable in meeting the various exigencies of use. I desire to be understood, therefore, as reserving the right to make any and all such changes or modifications as may be found essential or desirable insofar as the same may fall within the spirit and broad scope of the invention as expressed in the accompanying claims.

And while I have herein referred to the apparatus as of the step-by-step type, having all of the advantageous characteristics of that type, it is to be understood, of course, that the particular construction shown has the additional advantage of direct reading, in that the particular arrangement will permit the indicator to pass direct to the proper point without step-by-step action. That is, the position of the magnet at any time is positive and definite, being independent of its previous position; so that, should the current be interrupted and the rotating element displaced, the restoration of the current will return the indicator to a correct position, as indicated by the particular position of the circuit make and break mechanism.

Having thus described my invention, what I claim as new is:

1. In an electric indicator having a rotor comprising a plurality of polarized elements and a stator comprising a series of at least four magnetic windings having pole pieces cooperating magnetically with said polarized elements and so arranged that the action of less than the total number of windings will hold the polarized elements in a predetermined position, the method of shifting the polarized elements which consists in varying in successive steps the number of windings energized so as to produce more than two positionings of a polarized element between stator windings and in energizing at each step a series of at least three windings and less than the whole series of windings with the windings energized at each step taking in more than two right angles about the rotor whereby a substantially balanced and interlocking relation is provided at each step between the stator and the rotor.

2. In an electric indicator of the type recited in claim 1, the method of shifting the polarized elements which consists in first increasing and then decreasing the number of windings energized so as to produce more than two positionings of a polarized element between adjacent stator windings and in energizing at each step a series of at least three windings and less than the whole series of windings with the windings energized at each step taking in more than two right angles about the rotor, whereby a substantially balanced and interlocking relation is provided at each step between the stator and the rotor.

3. In apparatus for providing step by step movement of a rotor by the resultant action of a plurality of magnetic circuits, a stator comprising a plurality of spaced field magnets each provided with a pole piece, a rotor cooperating therewith and including a plurality of polarized elements, the polarized elements each being provided with more than two equally spaced salient poles for cooperation with the field magnet pole pieces whereby the polarized elements are adapted to assume more than two positions between adjacent field pole pieces in the production of the magnetic circuits, with all the salient poles active at each position of the same.

4. In an apparatus for providing step by step movement of a rotor by the resultant action of a plurality of magnetic circuits, a stator comprising a plurality of spaced field magnets provided with pole pieces, a rotor cooperating therewith and including a pair of oppositely positioned polarized elements, the polarized elements each being provided with more than two equally spaced salient poles for cooperation with the field magnet pole piece, the construction being such that the polarized elements are adapted to assume more than two positions between centers of adjacent field pole pieces in the production of the magnetic circuits, with all the salient poles active at each position of the same.

5. In an electric motor, a stator comprising a plurality of spaced field magnets provided with pole pieces and a rotor including a plurality of pole pieces, each rotor pole piece being provided with more than two equally spaced salient poles, the length of each stator pole piece face being equal to the distance between the opposite sides of the end salient poles of a rotor pole piece and the distance between adjacent stator pole piece faces being equal to the distance between adjacent sides of two salient poles of a rotor pole piece.

6. In an electric motor, a stator comprising a plurality of spaced field magnets provided with pole pieces and a rotor including a plurality of pole pieces cooperating with the stator pole pieces, each rotor pole piece being provided with more than two equally spaced salient poles, the length of each stator pole piece face being equal to the distance between the opposite sides of the end salient poles of a rotor pole piece and the distance between adjacent stator pole piece faces being equal to the distance between adjacent sides of two salient poles of a rotor pole piece, the distance between adjacent salient poles being equal to one-fourth of the distance between the centers of adjacent stator pole piece faces.

7. In apparatus for providing step by step movement of a rotatable element by the resultant action of a plurality of magnetic circuits, a pair of polarized elements movable in synchronism with the rotatable element, and a plurality of field magnets having pole pieces operative with said polarized elements to position the latter in more than two positionings between adjacent field magnet pole pieces in the selective production of the magnetic circuits, said polarized elements each having more than two equally spaced salient poles all active in the completion of the circuits at each positioning of the said polarized elements.

8. In apparatus for providing step by step movement of a rotatable element by the resultant action of a plurality of magnetic circuits, a pair of polarized elements movable in synchronism with the rotatable element, and a plurality of field magnets having pole pieces operative with said polarized elements to cause the latter to assume more than two positions between adjacent field magnet pole pieces in the selective production of the magnetic circuits, said polarized elements having an equal number of equally spaced salient poles all active in the completion of the circuits at each position of the polarized elements, the number of salient poles of a polarized element being greater than two.

9. In apparatus for providing step by step movement of a rotatable element by the resultant action of a plurality of magnetic circuits, a pair of polarized elements movable in synchronism with the rotatable element, and a plurality of field magnets having pole pieces operative with said polarized elements to establish four positions of the latter from field pole to field pole in the selective production of the magnetic circuits, said polarized elements each having four salient poles all active in the completion of the circuits at each position of the polarized elements.

10. An electric indicator having a rotor carrying a single pair of armatures, each provided with a plurality of salient poles, a stator comprising a plurality of magnet windings spaced about the rotor, each winding having a pole piece cooperating with said armatures, and means for energizing said windings including provisions for varying in successive steps the number of windings energized so as to produce more than two positionings of an armature between adjacent stator windings, such provisions being adapted for energizing more than two windings at each step.

11. An electric indicator having a rotor carrying a plurality of armatures, a stator comprising a plurality of magnet windings spaced about the rotor, each winding having a pole piece cooperating with said armature, and means for energizing said windings, including provisions for varying in successive steps the number of windings energized so as to produce more than two positionings of an armature between adjacent stator windings, such provisions being adapted for energizing at each step a series of three or more windings less than the total number of stator windings and spaced about the rotor for more than two right angles.

12. An electric indicator having a rotor carrying a single pair of armatures, each provided with a plurality of salient poles, a stator comprising a plurality of magnet windings spaced about the rotor, each winding having a pole piece cooperating with said armature and means for energizing said windings including provisions for first energizing more than two windings and then energizing more than three windings spaced about the stator so as to produce more than two positionings of an armature between adjacent stator windings.

13. An electric indicator having a rotor, field magnets concentrically located about said rotor, armatures on said rotor cooperating with pole pieces on said magnets, each of said armatures having more than two equally spaced salient poles, the length of each pole piece face being equal to the distance between the opposite sides of the end salient poles, and the distance between adjacent pole piece faces being equal to the distance between adjacent sides of two salient poles.

14. An electric indicator having a rotor, field magnets concentrically located about said rotor, armatures on said rotor cooperating with pole pieces on said magnets, each of said armatures having more than two equally spaced salient poles, the length of each pole piece face being equal to the distance between the opposite sides of the end salient poles and the distance between adjacent pole piece faces being equal to the distance between adjacent sides of two salient poles, the distance between adjacent salient poles being equal to a quarter of the distance between the centers of adjacent pole piece faces.

15. In apparatus for providing step-by-step movement to a rotatable element by the resultant action of a plurality of magnetic circuits, a pair of polarized elements movable in synchronized relation with the rotatable element, a plurality of field magnets having pole pieces operative with said polarized elements to establish magnetic circuits, said polarized elements each having four salient poles all active in the completion of the circuits, the pole pieces of adjacent magnets operative with a polarized element being spaced a distance to locate adjacent salient poles of the polarized element in operative relation to the respective pole pieces when the polarized element is operative with both pieces.

16. In apparatus for providing step-by-step movement to a rotatable element by the resultant action of a plurality of magnetic circuits, a pair of polarized elements movable in synchronism with the rotatable element, a plurality of field magnets having pole pieces operative with said polarized elements to establish magnetic circuits, said polarized elements each having four salient poles active in the completion of the circuits, the pole pieces of adjacent magnets operative with a polarized element being spaced a distance to locate adjacent salient poles of the polarized element in operative relation to the respective pole pieces when the polarized element is operative with both pieces, and means whereby advancing movements of the rotating element through a succession of steps will progressively change the number of salient poles active with a pole piece.

17. In apparatus for providing step-by-step movement to a rotatable element by the resultant action of a plurality of magnetic circuits, a pair of polarized elements movable in synchronism with the rotatable element, a plurality of field magnets having pole pieces operative with said polarized elements to establish magnetic circuits, said polarized elements each having four salient poles active in the completion of the circuits, the pole pieces of adjacent magnets operative with a polarized element being spaced a distance to locate adjacent salient poles of the element in operative relation to the respective pole pieces when the element is operative with both pieces, and means whereby advancing movements of the rotating element through a succession of steps will progressively change the number of salient poles active with a pole piece with the progressive relation of one pole piece the reverse of that of the other pole piece.

18. In apparatus for providing step-by-step movement to a rotatable element by the resultant action of a plurality of magnetic circuits, a pair of polarized elements movable in synchronsim with the rotatable element, a plurality of field magnets having pole pieces operative with said polarized elements to establish magnetic circuits, said polarized elements each having four salient poles active in the completion of the circuits, and means whereby the number of salient poles of a polarized element active with a predetermined pole piece will be equal in number to the number of poles active with an adjacent pole piece in one position of the rotating element and be of unequal number relation thereto in a succeeding position of such rotating element.

In testimony whereof I have hereunto set my hand.

FRANK W. WOOD.